US010622600B2

(12) United States Patent
Reinshagen et al.

(10) Patent No.: US 10,622,600 B2
(45) Date of Patent: Apr. 14, 2020

(54) DEVICE AND METHOD FOR BRACING A BATTERY MODULE, AND ALSO BATTERY SYSTEM AND VEHICLE

(71) Applicant: Robert Bosch GmbH, Stuttgart (DE)

(72) Inventors: Holger Reinshagen, Bamberg (DE); Michael Austen, Bamberg (DE); Martin Gerlach, Strullendorf (DE); Silvan Poller, Neisseaue Ot Kaltwasser (DE); Gerhard Schubert, Strullendorf (DE)

(73) Assignee: Robert Bosch GmbH, Stuttgart (DE)

( * ) Notice: Subject to any disclaimer, the term of this patent is extended or adjusted under 35 U.S.C. 154(b) by 510 days.

(21) Appl. No.: 15/076,874

(22) Filed: Mar. 22, 2016

(65) Prior Publication Data

US 2016/0285061 A1 Sep. 29, 2016

(30) Foreign Application Priority Data

Mar. 23, 2015 (DE) ........................ 10 2015 205 219

(51) Int. Cl.
| H01M 2/10 | (2006.01) |
| H01M 10/613 | (2014.01) |
| H01M 10/625 | (2014.01) |
| H01M 10/647 | (2014.01) |
| H01M 10/6556 | (2014.01) |
| H01M 10/04 | (2006.01) |

(52) U.S. Cl.
CPC ...... *H01M 2/1077* (2013.01); *H01M 10/0481* (2013.01); *H01M 10/613* (2015.04); *H01M 10/625* (2015.04); *H01M 10/647* (2015.04); *H01M 10/6556* (2015.04); *H01M 2220/20* (2013.01)

(58) Field of Classification Search
CPC .......................... H01M 2/1077; H01M 10/613
See application file for complete search history.

(56) References Cited

U.S. PATENT DOCUMENTS

| 2006/0204840 | A1* | 9/2006 | Jeon ..................... H01M 2/1077 429/152 |
| 2007/0042263 | A1 | 2/2007 | Balash |
| 2011/0287287 | A1* | 11/2011 | Kang ................... H01M 2/1077 429/82 |
| 2011/0293974 | A1 | 12/2011 | Yoon et al. |
| 2012/0187609 | A1 | 7/2012 | Rossmann et al. |
| 2014/0113171 | A1* | 4/2014 | Schaefer ............. H01M 2/1077 429/120 |

(Continued)

FOREIGN PATENT DOCUMENTS

| DE | 102010032965 | 2/2012 |
| DE | 102011003535 | 8/2012 |

(Continued)

*Primary Examiner* — Stephan J Essex
(74) *Attorney, Agent, or Firm* — Michael Best & Friedrich LLP

(57) ABSTRACT

A device (200) for bracing a battery module (100) which comprises a multiplicity of battery cells (101, ... 10n), characterized by: a first clamping plate (201) for the positioning of the battery cells (101, ... 10n), a cooler (300) which is between the first clamping plate (201) and the battery cells (101, ... 10n), and a brace (205, 206) which is configured so as to brace the first clamping plate (201, 202) and the battery cells (101, ... 10n) against one another.

13 Claims, 7 Drawing Sheets

(56) References Cited

U.S. PATENT DOCUMENTS

2016/0093847 A1* 3/2016 Gunther .............. H01M 2/1077
429/120

FOREIGN PATENT DOCUMENTS

| DE | 202012006447 | | 8/2012 |
|----|--------------|----|--------|
| DE | 102012217367 | A1 | 3/2014 |
| DE | 102013207592 | | 8/2014 |
| EP | 2669917 | A1 | 12/2013 |

* cited by examiner

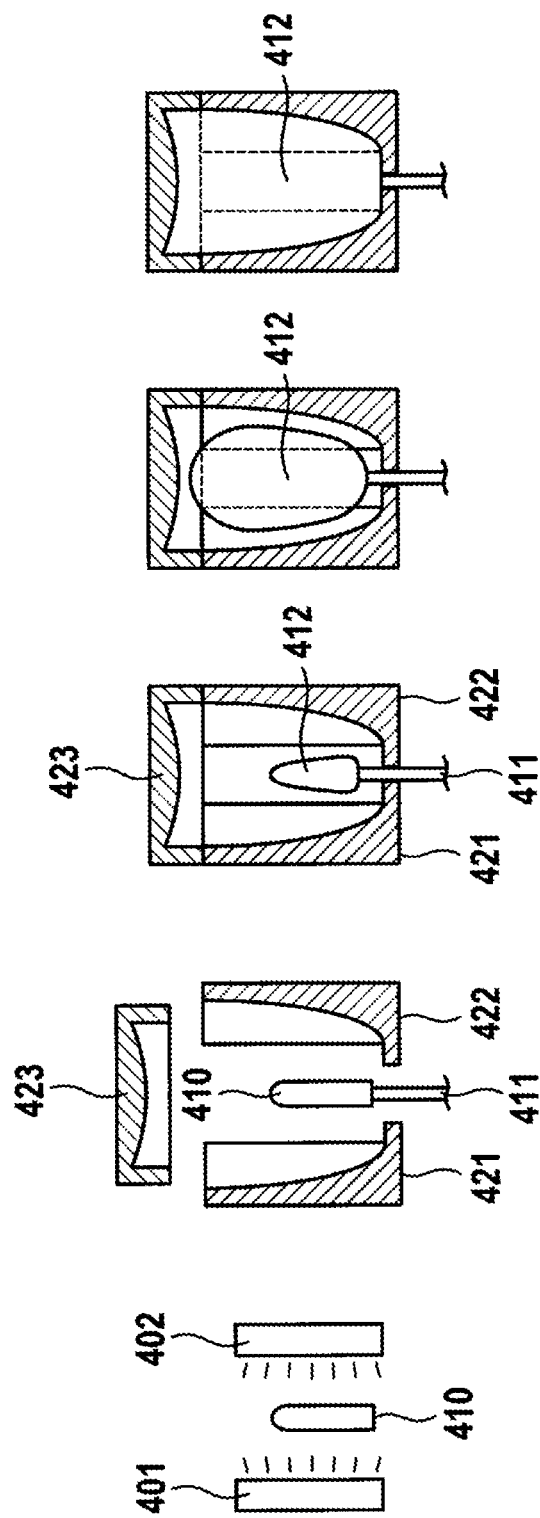

DEVICE AND METHOD FOR BRACING A BATTERY MODULE, AND ALSO BATTERY SYSTEM AND VEHICLE

BACKGROUND OF THE INVENTION

Both in static applications, for example wind turbines, and in mobile applications, for example electric motor vehicles (electric vehicles, EV), hybrid vehicles (hybrid electric vehicles, HEV) or plug-in hybrid vehicles (plug-in hybrid electric vehicles, PHEV), increasing use is being made of new battery systems or battery modules, for example with lithium-ion accumulators, as rechargeable electrical energy stores (EES, electro-chemical storage system, ESS).

A battery system (accumulator system) comprises a multiplicity of battery cells (accumulator cells), for example cylindrical or prismatic battery cells or battery cells with electrode windings (battery cell windings, cell windings, Jerry Roll, JR). The battery cells may be connected in series, in order to increase the electrical voltage, and/or connected in parallel, in order to increase the maximum electrical current and the capacity. It is thus possible for the battery cells to be combined to form battery modules or battery units (battery packs). In the case of usage for driving vehicles, it is for example possible for approximately 100 battery cells to be connected in series or parallel (as a traction battery).

The battery cells are normally combined to form battery modules. For this purpose, bracing of the battery cells is necessary in order that the battery cells remain stable. Furthermore, to ensure the durability of the battery cells, it is necessary that the battery cells do not become too hot. For this purpose, a housing of the battery module is commonly equipped with a cooler, which maintains the optimum battery temperature.

DE 10 2011 003 535 A1 has disclosed a battery module with a cooler which has at least one heat transfer surface for the transfer of heat energy, wherein the energy store module has at least one abutment surface for the abutment of the heat transfer surface and has at least two module carriers which are arranged on two mutually opposite sides of the energy store module.

The device has a clamping plate with at least two connecting elements, arranged on opposite ends of the clamping plate, for the connection of the clamping plate to the module carriers, wherein the clamping plate is designed to surround the cooler over a part of the circumference, and exert a bracing force on at least sub-regions of a side of the cooler which is averted from the heat transfer surface, when the clamping plate is connected to the module carriers.

SUMMARY OF THE INVENTION

It is an object of the present invention to provide an improved device and an improved method for bracing a battery module, with which the battery cells remain braced in stable fashion and the temperature of the battery cells can be controlled.

The devices and methods according to the invention having the features of the independent claims have the advantage that battery cells can, in an inexpensive manner, be assembled in stable fashion to form a battery module and cooled in an effective manner.

It is expediently possible for the device to also comprise a second clamping plate, wherein the bracing means may furthermore be configured to brace the battery cells between the first clamping plate and the second clamping plate. It is thereby possible to cool more than one side of the battery cells.

It is expediently possible for the first clamping plate and the second clamping plate to be configured so as to form a part of a housing of the battery module. It is thereby possible to dispense with a housing.

It is expediently possible for the cooler to be realized or implemented as a hollow profile. It is thereby possible for a coolant, for example water, oil or air, to be caused to flow through a cavity or through multiple cavities of the hollow profile.

It is expediently possible for the bracing means to be realized or implemented as an adhesive strip or multiple adhesive strips and/or a screw or multiple screws and/or a welded connection or multiple welded connections. It is thereby possible to obtain a simple and/or durable bracing action.

The invention furthermore provides a battery system which comprises a battery module and the device described above.

The invention furthermore provides a vehicle, in particular motor vehicle such as an electric motor vehicle, hybrid vehicle, plug-in hybrid vehicle or electric motorcycle (electric bike, E-bike), electric bicycle (pedal electric cycle, pedelec), a watercraft such as an electric boat or submarine, an aircraft or a spacecraft, which comprises the above-described battery system connected to the vehicle.

The invention furthermore provides a method for bracing a battery module, wherein the battery module comprises a multiplicity of battery cells, characterized by positioning the battery cells with a first clamping plate, inserting a cooler between the first clamping plate and the battery cells, and bracing the first clamping plate and the battery cells against one another by way of a bracing means. It is thereby possible for the battery cells to be braced and cooled by way of a single method.

The invention also provides a method for bracing a battery module, wherein the battery module comprises a multiplicity of battery cells, characterized by positioning the battery cells with the first clamping plate, and bracing the first clamping plate and the battery cells against one another by way of a bracing means, wherein the first clamping plate comprises a cooler. It is thereby possible for the battery cells to be braced and cooled by way of the cooler.

The cooler may expediently be produced by way of a stretch blow molding process. It is thereby possible to realize the cooler between the battery cells and the clamping plate, wherein the cooler adapts decisively to the boundaries of different battery cells.

BRIEF DESCRIPTION OF THE DRAWINGS

Exemplary embodiments of the invention are illustrated in the drawing and will be discussed in more detail in the following description.

FIGS. 7A-7E are schematic two-dimensional illustrations of a method for producing a part of a cooler.

DETAILED DESCRIPTION

Figure 1:
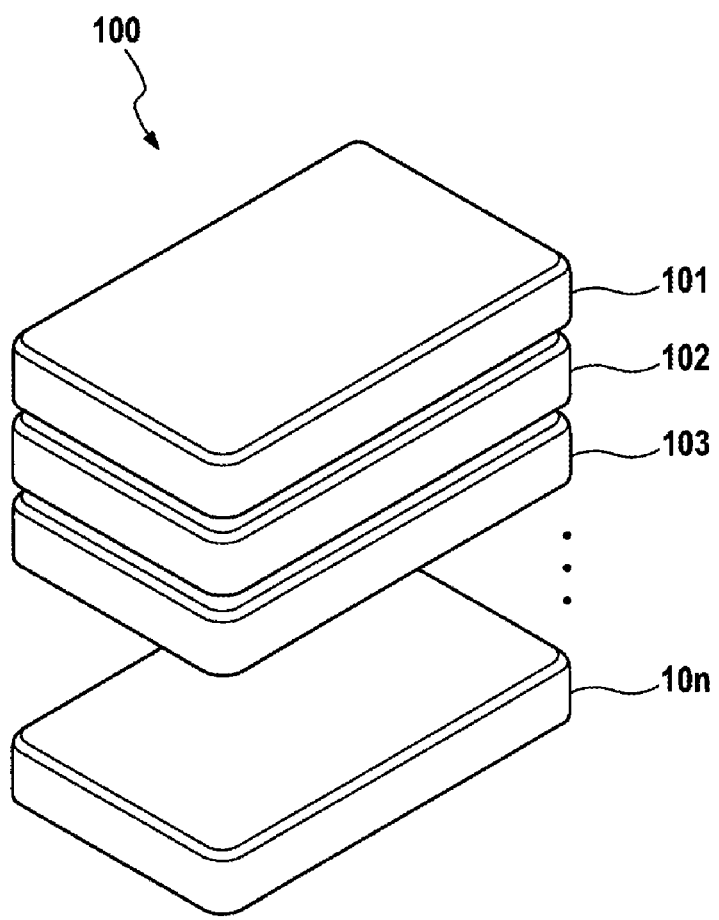
FIG. 1 is a schematic three-dimensional illustration of multiple battery cells.

FIG. 1 is a schematic three-dimensional illustration of multiple battery cells 101, 102, 103, . . . 10n. The battery cells 101, 102, 103, . . . 10n form a battery module 100. The battery cells 101, 102, 103, . . . 10n may be arranged adjacent to one another, one behind the other or one above the other. Furthermore, the battery cells 101, 102, 103, . . . 10n may be electrically connected in series and/or in parallel with one another, for example by way of a connection or multiple connections such as cell connectors or cables (not illustrated in FIG. 1).

Figure 2:
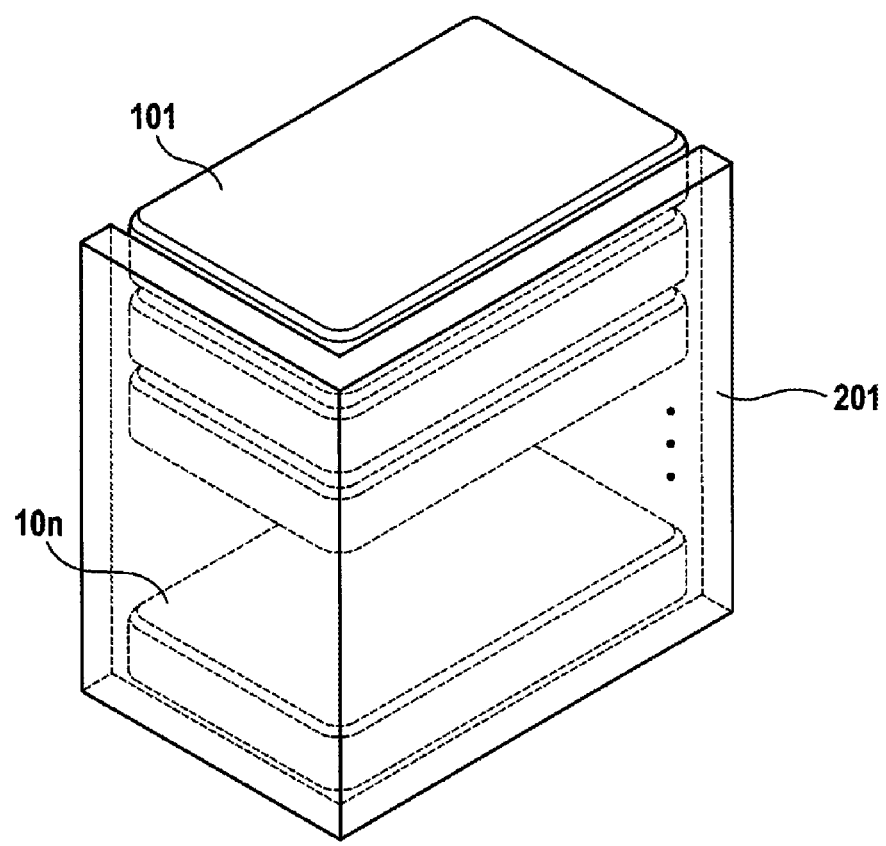
FIG. 2 is a schematic three-dimensional illustration of multiple battery cells with a clamping plate.

FIG. 2 is a schematic three-dimensional illustration of multiple battery cells with a clamping plate. To position the battery cells 101, 102, 103, . . . 10n, a clamping plate 201 as illustrated in FIG. 2 may be used. The clamping plate 201 is illustrated as having an L-shaped profile, though the present invention is not restricted to this, it rather also being possible, for example, for the clamping plate 201 to have a flat profile or any profile which permits the positioning of the battery cells 101-10n. The profile may be produced for example from plastic or insulated or coated or lacquered metal.

Figure 3:
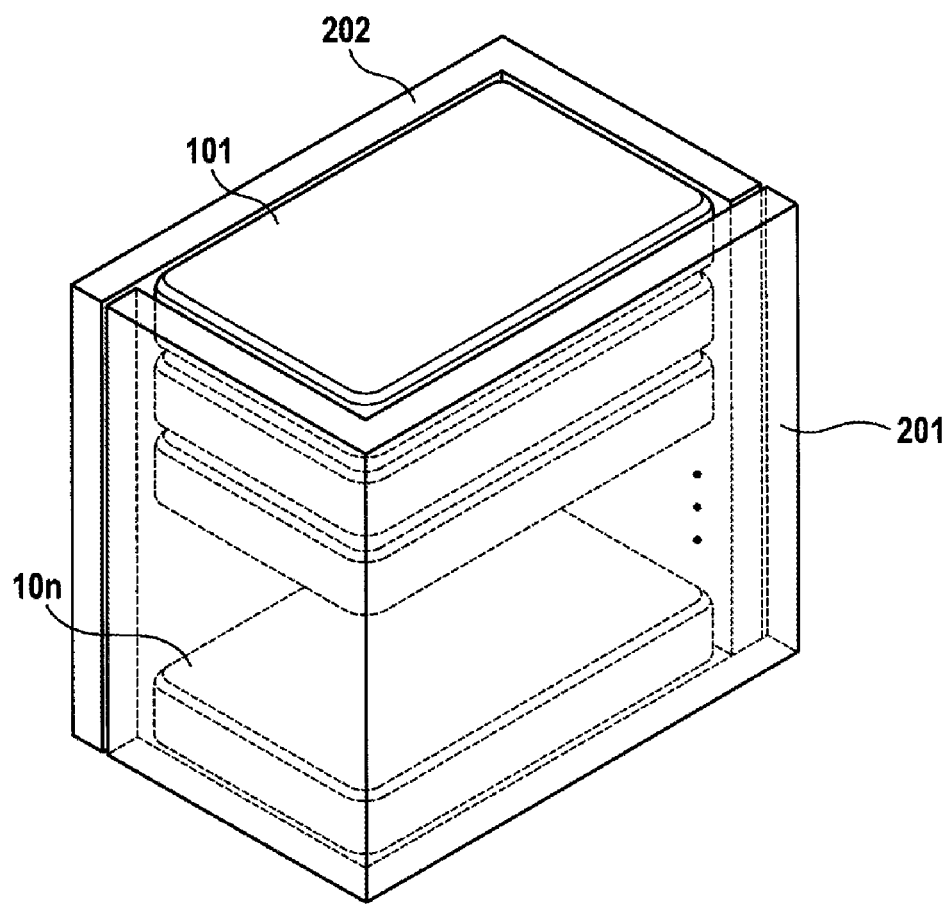
FIG. 3 is a schematic three-dimensional illustration of multiple battery cells with two clamping plates.

FIG. 3 is a schematic three-dimensional illustration of multiple battery cells 101, 102, 103, . . . 10n with two clamping plates 201, 202: a first clamping plate 201 and a second clamping plate 202. Like the first clamping plate 201, the second clamping plate 202 is not restricted to an L-shaped profile. If the first clamping plate 201 and the second clamping plate 202 both have an L-shaped profile, the two clamping plates 201, 202 surround the battery cells 101, 102, 103, . . . 10n. A similar result may however also be achieved with four flat clamping plates, with two flat clamping plates and one clamping plate with an L-shaped profile, and so on. The battery cells 101, 102, 103, . . . 10n need not be completely surrounded. Accordingly, it is for example also possible for the clamping plates 201, 202 to adjoin only two opposite sides of the battery cells 101, 102, 103, . . . 10n. The first clamping plate 201 and the second clamping plate 202 may thereby form at least a part of a housing of the battery module 100.

Figure 4:
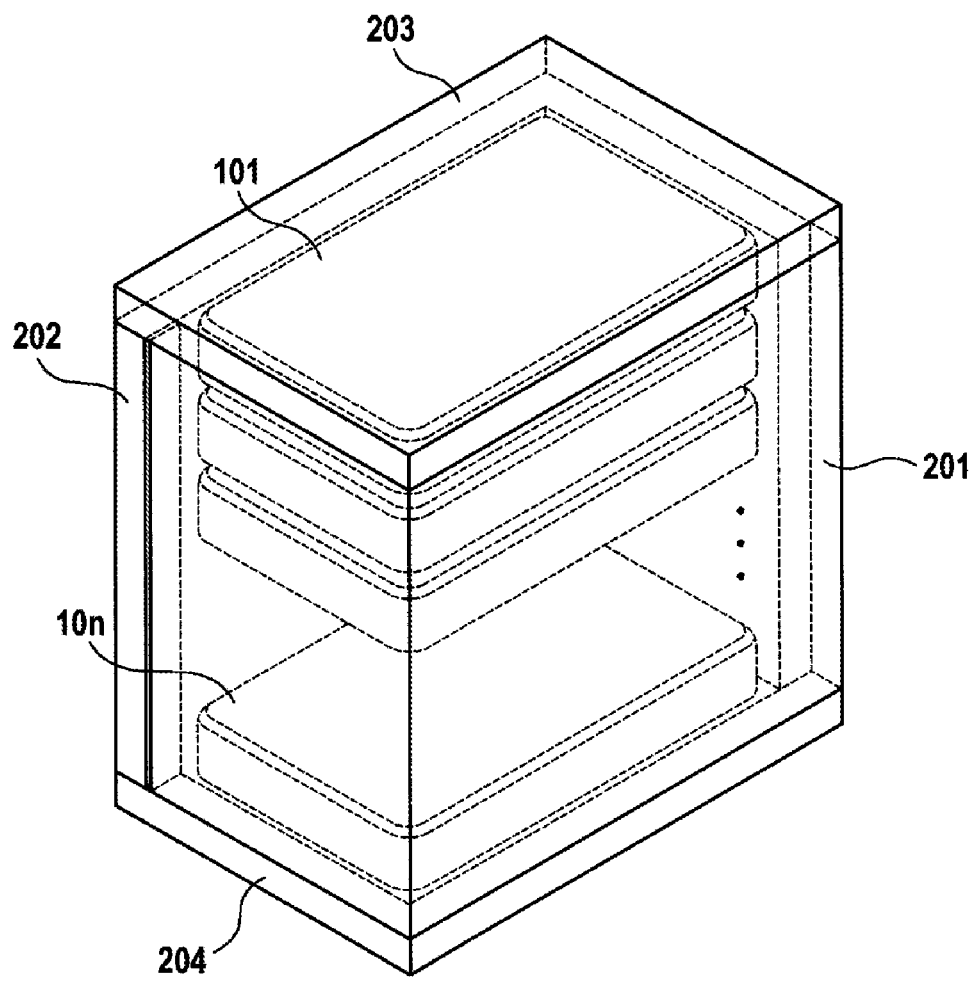
FIG. 4 is a schematic three-dimensional illustration of multiple battery cells with two clamping plates and two contact plates.

FIG. 4 is a schematic three-dimensional illustration of multiple battery cells 101, 102, 103, . . . 10n with the two clamping plates 201, 202 and two contact plates 203, 204. The two contact plates 203, 204 make it possible for the multiple battery cells 101, 102, 103, . . . 10n to expediently be held together and form a sealed housing which permits improved moisture resistance. The contact plates 203, 204 may, for the electrical contacting or connection of the battery cells 101, 102, 103, . . . 10n, be of electrically conductive form and comprise, for example, a metal such as aluminum or copper. If for example direct contact with the battery cells 101, 102, 103, . . . 10n is desired or acceptable, it is possible to dispense with the contact plates 203, 204.

Figure 5:
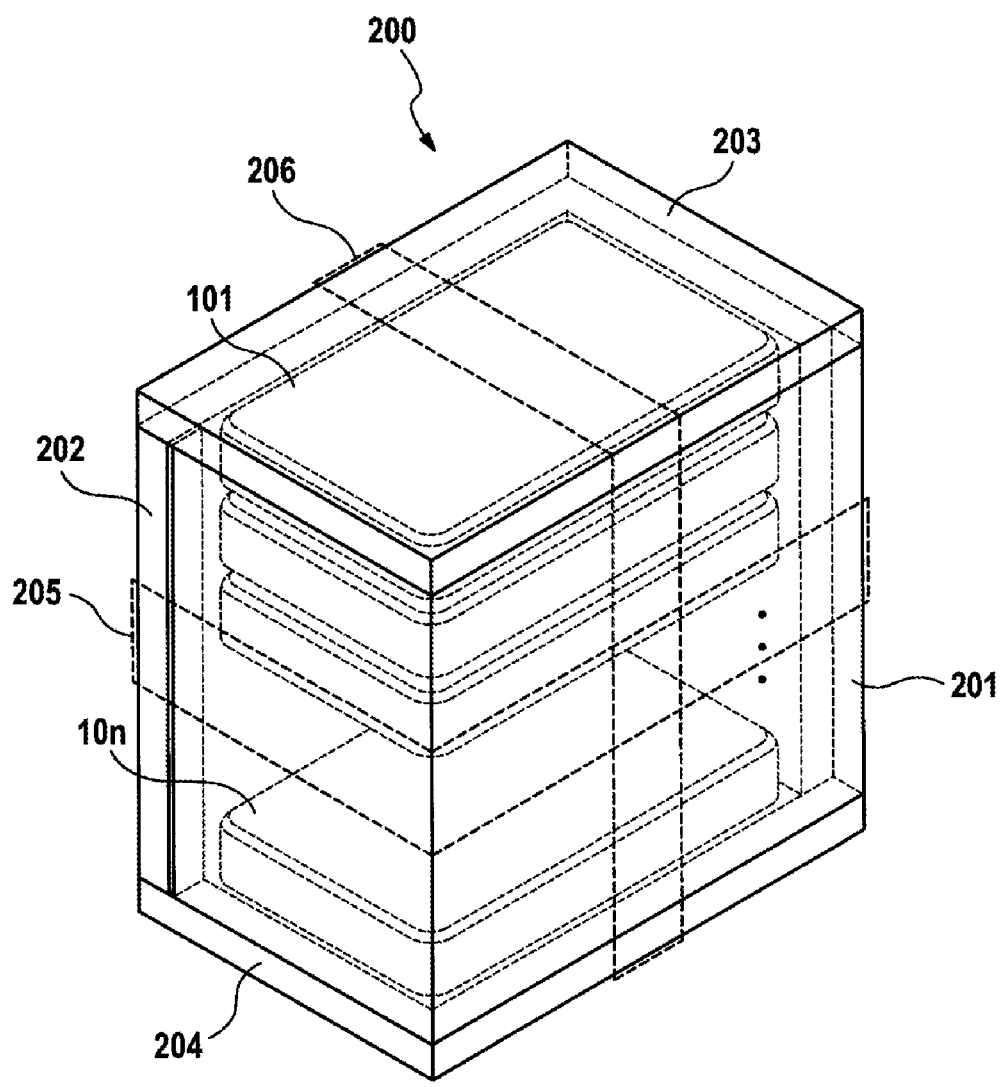
FIG. 5 is a schematic three-dimensional illustration of a device 200 for bracing a battery module, according to an embodiment of the invention.

FIG. 5 is a schematic three-dimensional illustration of a device 200 for bracing a battery module as per an embodiment of the invention. The battery module comprises a multiplicity of battery cells 101, 102, 103, . . . 10n. The device 200 comprises a first clamping plate 201 and a second clamping plate 202 for the positioning of the battery cells 101, 102, 103, . . . 10n, a cooler 300 (not illustrated in FIG. 5) which is arranged between the battery cells 101, 102, 103, . . . 10n and the first clamping plate 201 and/or second clamping plate 202, and a bracing means 205, 206 or multiple bracing means which is/are configured to brace the clamping plates 201, 202 and the battery cells 101, 102, 103, . . . 10n against one another.

The bracing means 205, 206 may be realized for example in the form of a strip, such as an adhesive strip, plastics strip or metal strip, a screw connection, such as a screw, or a welded connection, such as weld spots or weld seams.

The cooler 300 (not illustrated in FIG. 5) is provided between the clamping plate 201, 202 and the battery cells 101, 102, 103, . . . 10n such that the bracing means 205, 206 can fix the cooler 300 between the clamping plate 201, 202 and the battery cells 101, 102, 103, . . . 10n. In this way, the cooler 300 is used in direct contact with the outer surfaces of the battery cells 101, 102, 103, . . . 10n, such that the effectiveness of the cooler 300 can be improved or optimized.

A corresponding method for bracing the battery module 100 may comprise the following steps: positioning the battery cells 101, 102, 103, . . . 10n with the clamping plate 201, 202 and bracing the clamping plate 201, 202 and the battery cells 101, 102, 103, . . . 10n against one another by way of the bracing means 205, 206. In this embodiment, the first clamping plate 201, 202 is provided with the cooler 300, such that the bracing of the clamping plate 201, 202 brings the cooler into contact with the battery cells 101, 102, 103, . . . 10n.

In another embodiment of the invention, the cooler 300 may be inserted between the clamping plate 201, 202 and the battery cells 101, 102, 103, . . . 10n after the bracing of the clamping plate 201, 202. In one variant of said other embodiment, the cooler 300 may be inserted or pressed in between the clamping plate 201, 202 and the battery cells 101, 102, 103, . . . 10n. In a second variant of said other embodiment, the cooler 300 may be produced between the clamping plate 201, 202 and the battery cells 101-10n by way of a stretch blow molding process.

A corresponding method for bracing the battery module 100 may comprise the following steps: positioning the battery cells 101, 102, 103, . . . 10n with the clamping plate 201, 202, inserting the cooler 300 between the first clamping plate 201, 202 and the battery cells 101, 102, 103, . . . 10n, and bracing the clamping plate 201, 202 and the battery cells 101, 102, 103, . . . 10n against one another by way of the bracing means 205, 206.

Figure 6:
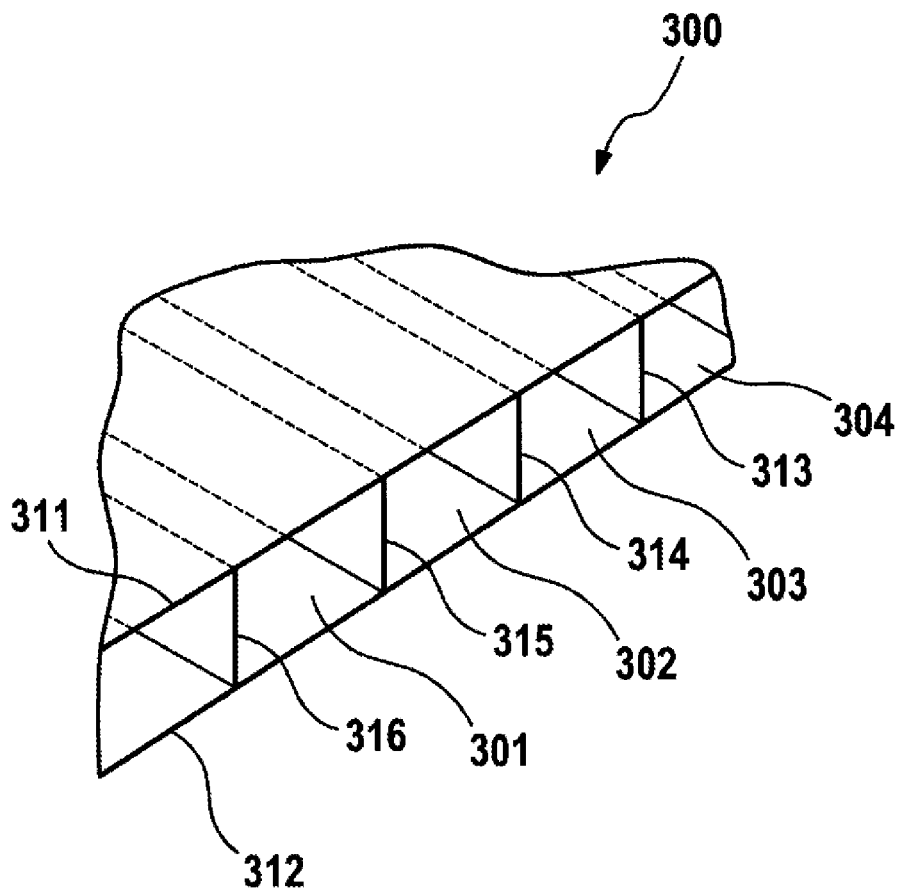
FIG. 6 is a schematic three-dimensional illustration of a cooler.

FIG. 6 is a schematic three-dimensional illustration of a cooler 300.

The cooler 300 may be realized as a hollow profile. The cooler 300 may comprise a multiplicity of cavities 301-304 which are defined by walls 311, . . . 316 and through which a temperature control medium such as coolant can flow.

The cooler 300 may for example be produced by way of a stretch blow molding process, which will be described below with reference to FIGS. 7A-7E. The cavities 301, . . . 304 may be realized by way of a multiplicity of parisons 410 placed adjacent to one another.

FIGS. 7A-7E are schematic two-dimensional illustrations of the stretch blow molding process for producing at least a part of the cooler 300 as per the other embodiment of the invention.

In the case of hollow bodies being produced in the stretch blow molding process, it is provided that, as illustrated in FIG. 7A, a parison 410 composed of plastic is, in a first method step, adjusted to a processing temperature of for example 90° C. to 120° C. in a heating device 401, 402 such as a heating furnace or a heating lamp, such that the viscosity of the plastic decreases. As a result of the changed viscosity of the plastic, the deformability of the parison 410 in the second working step, the stretch blow molding illustrated in FIGS. 7B-7E, is made possible.

In the second method step, as illustrated in FIGS. 7B-7E, the process of molding a cavity 412 takes place. For this purpose, the temperature-adjusted parison 410 is transferred to the blowing molds 421, 422, 423. In this embodiment, the battery cells 101, 102, 103, . . . 10n may serve, or be regarded, as blowing mold 421, the clamping plates 201, 202 may serve, or be regarded, as blowing mold 422, and the contact plates 203, 204 may serve, or be regarded, as blowing mold 423.

The blowing molds 421, 422, 423 are, as illustrated in FIG. 7B, fitted with the temperature-adjusted parison 410 and closed. Subsequently, as illustrated in FIGS. 7C and 7D, the pressure molding process is performed. Here, a gas such as air is blown into the temperature-adjusted parison 410 such that the gas-filled cavity 412 can form, whereby the material of the parison 410 is pressed against the walls of the blowing molds 421, 422, 423 and, there, as illustrated in FIG. 7E, has the final contours imparted thereto.

It is thereby possible to realize ideal adaptation of the cooler 300, which comprises one or more parisons 410, to the contour of the battery cells 101-10n. It is also possible for a preload to be realized between the battery cells 101-10n and the clamping plate 201, 202 by way of the cooler, which prevents the movement of the battery cells 101-10n.

Finally, it is pointed out that expressions such as "comprising" and "having" or the like do not rule out the possible provision of further elements or steps. The numbers used are merely exemplary, such that a multiplicity may comprise two, four, five, six or more elements or steps. It is also pointed out that articles such as "a" or "an" do not rule out a multiplicity. It is also pointed out that numerals or ordinals such as "first", "second" etc. serve merely for distinction of elements and steps, without specifying or restricting a sequence of the arrangement of the elements or of the execution of the steps. Furthermore, the features described in conjunction with the various embodiments may be combined with one another in any desired manner. Finally, it is pointed out that the reference designations in the claims are not to be interpreted as limiting the scope of protection of the claims.

Various features and advantages of the invention are set forth in the following claims.

What is claimed is:

1. A device (200) for bracing a battery module (100) having a multiplicity of battery cells (101, . . . 10n) arranged in a stack, the device comprising
    a first clamping plate (201) configured to position the battery cells (101, . . . 10n), wherein the first clamping plate (201) has an L-shaped profile,
    a cooler (300) which is between the first clamping plate (201) and the battery cells (101, . . . 10n),
    first and second contact plates (203, 204) of electrically conductive form positioned at respective first and second ends of the first clamping plate (201) to cooperate with the first clamping plate (201) in defining a sealed housing for the battery module (100), wherein the first and second contact plates (203, 204) are positioned at respective ends of the battery cell stack such that the first contact plate (203) makes electrical contact with only one battery cell of the multiplicity of battery cells (101, . . . 10n) at a first end of the battery cell stack and the second contact plate (204) makes electrical contact with only one battery cell of the multiplicity of battery cells (101, . . . 10n) at a second end of the battery cell stack, and
    a bracing means (205, 206) which is configured to brace the first clamping plate (201, 202) and the battery cells (101, . . . 10n) against one another, and which is also configured to brace the battery cells (101 . . . 10n) between the first and second contact plates (203, 204).

2. The device (200) according to claim 1, further comprising a second clamping plate (202), wherein the bracing means (205, 206) is further configured to brace the battery cells (101, . . . 10n) between the first clamping plate (201) and the second clamping plate (202).

3. The device (200) according to claim 2, wherein the first clamping plate (201) and the second clamping plate (202) are configured so as to form a part of a housing of the battery module (100).

4. The device (200) according to claim 1, wherein the cooler (300) is in the form of a hollow profile.

5. The device (200) according to claim 1, wherein the bracing means (205, 206) is in the form of an adhesive strip, multiple adhesive strips, a screw, multiple screws, a welded connection or multiple welded connections.

6. A battery system, comprising the battery module (100) and the device (200) according to claim 1.

7. A vehicle, comprising the battery system according to claim 6.

8. A method for bracing a battery module (100) having a multiplicity of battery cells (101, . . . 10n), the method comprising
    positioning the battery cells (101, . . . 10n) with a first clamping plate (201), the first clamping plate having an L-shaped profile, and the multiplicity of battery cells (101, . . . 10n) arranged in a stack,
    providing a cooler (300) either inserted between the first clamping plate (201) and the battery cells (101, . . . 10n) or the first clamping plate (201) comprising the cooler (300),
    positioning first and second contact plates (203, 204) of electrically conductive form at respective first and second ends of the battery cell stack and at respective first and second ends of the first clamping plate (201) to cooperate with the first clamping plate (201) in defining a sealed housing for the battery module (100), wherein each of the first and second contact plates (203, 204) is provided in electrical contact with only one of the multiplicity of battery cells (101, . . . 10n) located at a respective end of the battery cell stack, and
    bracing the first clamping plate (201) and the battery cells (101, . . . 10n) against one another with a bracing means (205, 206) that also braces the battery cells (101 . . . 10n) between the first and second contact plates (203, 204).

9. The method according to claim 8, wherein the cooler (300) is formed by a stretch blow molding process.

10. The method according to claim 9, wherein the cooler (300) is formed in the battery module (100).

11. The method (200) according to claim 8, wherein the bracing means (205, 206) is in the form of a strip, and bracing the first clamping plate (201) and the battery cells (101, . . . 10n) against one another includes extending the bracing means (205, 206) around the first clamping plate (201).

12. The device (200) according to claim 2, wherein the second clamping plate (202) has an L-shaped profile such that the first clamping plate (201) and the second clamping plate (202) cooperate to form a rectangular housing for the battery module (100).

13. The device (200) according to claim 1, wherein the bracing means (205, 206) is in the form of a strip that extends around the first clamping plate (201).

\* \* \* \* \*